(12) United States Patent
Lee et al.

(10) Patent No.: US 9,214,658 B2
(45) Date of Patent: Dec. 15, 2015

(54) BATTERY PACK

(75) Inventors: Hyun-Ye Lee, Yongin-si (KR);
Tae-Yong Kim, Yongin-si (KR);
Myung-Chul Kim, Yongin-si (KR);
Shi-Dong Park, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 446 days.

(21) Appl. No.: 12/926,207

(22) Filed: Nov. 2, 2010

(65) Prior Publication Data

US 2011/0117419 A1    May 19, 2011

Related U.S. Application Data

(60) Provisional application No. 61/272,929, filed on Nov. 19, 2009.

(51) Int. Cl.
| | | |
|---|---|---|
| *H01M 10/02* | (2006.01) | |
| *H01M 10/04* | (2006.01) | |
| *H01M 2/10* | (2006.01) | |

(52) U.S. Cl.
CPC ........ *H01M 2/1077* (2013.01); *Y10T 29/49108* (2015.01)

(58) Field of Classification Search
CPC ............ H01M 2/1061; H01M 2/1077; H01M 2/1083; H01M 10/5053; H01M 10/5032; H01M 10/5016; H01M 10/5004; H01M 10/5067; H01M 10/345; H01M 10/0525; H01M 2/10; H01G 11/18; H01G 9/155; Y02E 60/13; B60K 1/04; B60K 2001/0438; Y02T 10/7011; Y02T 10/7022
USPC .......................... 429/149, 151, 152, 153, 156
See application file for complete search history.

(56) References Cited

U.S. PATENT DOCUMENTS

| | | | | |
|---|---|---|---|---|
| 5,378,555 | A * | 1/1995 | Waters et al. .................... | 429/97 |
| 5,510,203 | A * | 4/1996 | Hamada et al. .................. | 429/53 |
| 6,479,185 | B1 * | 11/2002 | Hilderbrand et al. .......... | 429/148 |
| 7,393,608 | B2 * | 7/2008 | Cho .............................. | 429/123 |
| 7,763,380 | B2 * | 7/2010 | Morita et al. .................. | 429/176 |
| 8,557,429 | B2 | 10/2013 | Hamada et al. | |

(Continued)

FOREIGN PATENT DOCUMENTS

| | | |
|---|---|---|
| CN | 101116198 A | 1/2008 |
| CN | 101257130 | 9/2008 |

(Continued)

OTHER PUBLICATIONS

Japanese Office Action in JP 2010-258170, dated Nov. 13, 2012 (Lee, et al.).

(Continued)

*Primary Examiner* — Carlos Barcena
(74) *Attorney, Agent, or Firm* — Lee & Morse, P.C.

(57) ABSTRACT

A battery pack includes a first battery module, the first battery module including first unit batteries arranged side by side in a first direction, a second battery module adjacent to the first battery module, the second battery module including second unit batteries arranged side by side in the first direction, and at least one supporting block in a space between the first unit batteries and the second unit batteries, the at least one supporting block contacting the first and second battery modules.

20 Claims, 7 Drawing Sheets

(56) References Cited

U.S. PATENT DOCUMENTS

| | | | | |
|---|---|---|---|---|
| 2003/0162091 A1* | 8/2003 | Watanabe et al. | | 429/156 |
| 2005/0269995 A1* | 12/2005 | Donnelly et al. | | 320/150 |
| 2006/0286441 A1* | 12/2006 | Matsuoka et al. | | 429/99 |
| 2007/0141459 A1* | 6/2007 | Goto et al. | | 429/159 |
| 2007/0259263 A1* | 11/2007 | Shibuya et al. | | 429/186 |
| 2008/0124622 A1 | 5/2008 | Hamada et al. | | |
| 2008/0206628 A1 | 8/2008 | Honbou | | |
| 2008/0264291 A1* | 10/2008 | Pike et al. | | 105/50 |
| 2010/0143773 A1* | 6/2010 | Honbou | | 429/94 |

FOREIGN PATENT DOCUMENTS

| | | | |
|---|---|---|---|
| JP | 2003-142052 A | | 5/2003 |
| JP | 2009205986 A | * | 9/2009 |
| WO | WO 2006/087962 A1 | | 8/2006 |
| WO | WO 2008-078635 A1 | | 7/2008 |

OTHER PUBLICATIONS

European Office Action in EP 10170575.4-2119, dated Apr. 14, 2011 (Lee, et al.).
Korean Office Action in KR 10-2010-0076963, dated Nov. 2, 2011 (Lee, et al.).
European Office Action in EP 10170575.4-2119, dated Mar. 13, 2012 (Lee, et al.).
Chinese Office Action dated Jan. 15, 2014.
Chinese Office Action dated Jan. 9, 2015.
Chinese Office Action dated Jul. 23, 2014.
Chinese Office Action for 201010562741.0 dated Jul. 3, 2015; Lee, et al.

* cited by examiner

BATTERY PACK

CROSS-REFERENCE TO RELATED APPLICATION

This application claims priority to U.S. Provisional Application No. 61/272,929, filed in the U.S. Patent and Trademark Office on Nov. 19, 2009, and entitled "BATTERY PACK," which is incorporated by reference herein in its entirety and for all purposes.

BACKGROUND

1. Field

Embodiments relate to a battery pack.

2. Description of the Related Art

Secondary batteries are rechargeable and dischargeable. Secondary batteries are broadly used in high-tech electronic devices such as cellular phones, notebook computers, and camcorders, and are also used in vehicles.

A secondary battery may include an electrode assembly and an electrolyte. The electrode assembly may include a positive plate, a negative plate, and a separator. The electrolyte may include lithium ions. The positive plate and the negative plate of the electrode assembly may include electrode tabs protruding outward.

The electrode assembly may be accommodated in a case, and electrode terminals may be exposed outside the case. The electrode tabs may protrude outside the electrode assembly so as to be electrically connected to the electrode terminals. The case may have, e.g., a cylindrical shape or an angular shape.

A plurality of unit battery cells that are secondary batteries may be horizontally or vertically stacked so as to form a battery module. Also, a plurality of battery modules may be vertically and/or horizontally stacked so as to form one battery pack.

SUMMARY

It is a feature of an embodiment to provide a battery pack formed by vertically and/or horizontally stacking battery modules, each of which is formed by stacking a plurality of unit battery cells, in which deflection of the battery modules may be reduced.

At least one of the above and other features and advantages may be realized by providing a battery pack, including a first battery module, the first battery module including first unit batteries arranged side by side in a first direction, a second battery module adjacent to the first battery module, the second battery module including second unit batteries arranged side by side in the first direction, and at least one supporting block in a space between the first unit batteries and the second unit batteries, the at least one supporting block contacting the first and second battery modules.

The first and second battery modules may extend in a substantially horizontal direction, and the at least one supporting block may rests on the second unit batteries and support the first unit batteries.

The first and second battery modules may be spaced apart in a second direction, the second direction being normal to the first direction.

The supporting blocks may be arranged so as to uniformly distribute the weight of the first battery module on the second battery module.

The at least one supporting block may contact the first and second unit batteries.

The second unit batteries may be arranged such that sides of two adjacent second unit batteries are proximate to one another, and a supporting block rests on both of the two adjacent second unit batteries.

The at least one supporting block may include an elastic member that is elastically deformable in a direction normal to the first direction.

The elastic member may be a rubber member.

The at least one supporting block may be compressed in the battery pack, the at least one supporting block having a length, when uncompressed, that is larger than that of the space.

The at least one supporting block may be fixed to the second battery module.

The battery pack may further include an adhesive member fixing the at least one supporting block to the second battery module.

The battery pack may further include at least one additional battery module, the at least one additional battery module being combined with the first and second battery modules in a vertical stack, wherein at least one supporting block is disposed between adjacent battery modules in the vertical stack.

The first battery module may include first battery module end plates disposed at respective ends of the first battery module, the second battery module may include second battery module end plates at respective ends of the second battery module, and the first and second battery module end plates may support the first unit batteries such that the space is between the first unit batteries and the second unit batteries.

The battery pack may further include side frames extending in the first direction, the side frames being coupled to the second battery module end plates and supporting the second unit batteries from side surfaces of the second unit batteries.

The battery pack may further include a rigid member extending in the first direction, the rigid member being coupled to the second battery module end plates and supporting surfaces of the second unit batteries that are opposite to the first battery module.

At least one of the above and other features and advantages may also be realized by providing a vehicle, including a power source, the power source providing a motive power for the vehicle, and a battery pack configured to provide electricity to the power source, the battery pack including a first battery module, the first battery module including first unit batteries arranged side by side in a first direction, a second battery module adjacent to the first battery module, the second battery module including second unit batteries arranged side by side in the first direction, and at least one supporting block in a space between the first unit batteries and the second unit batteries, the at least one supporting block contacting the first and second battery modules.

At least one of the above and other features and advantages may also be realized by providing a method of stiffening a battery pack, the method including fixing first and second battery modules in a vertical stack, the first and second battery modules having respective end plates fixed together in a vertical direction so as to define a space between the first and second battery modules, and providing at least one supporting block in the space, the at least one supporting block resting on unit batteries of the second battery module and supporting the first battery module.

At least one of the above and other features and advantages may also be realized by providing a method of forming a battery pack, the method including providing a first battery module, the first battery module including first unit batteries arranged side by side in a first direction, arranging a second battery module adjacent to the first battery module, the second battery module including second unit batteries arranged side by side in the first direction, and providing at least one supporting block in the space between the first unit batteries and the second unit batteries, the at least one supporting block contacting the first and second battery modules.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
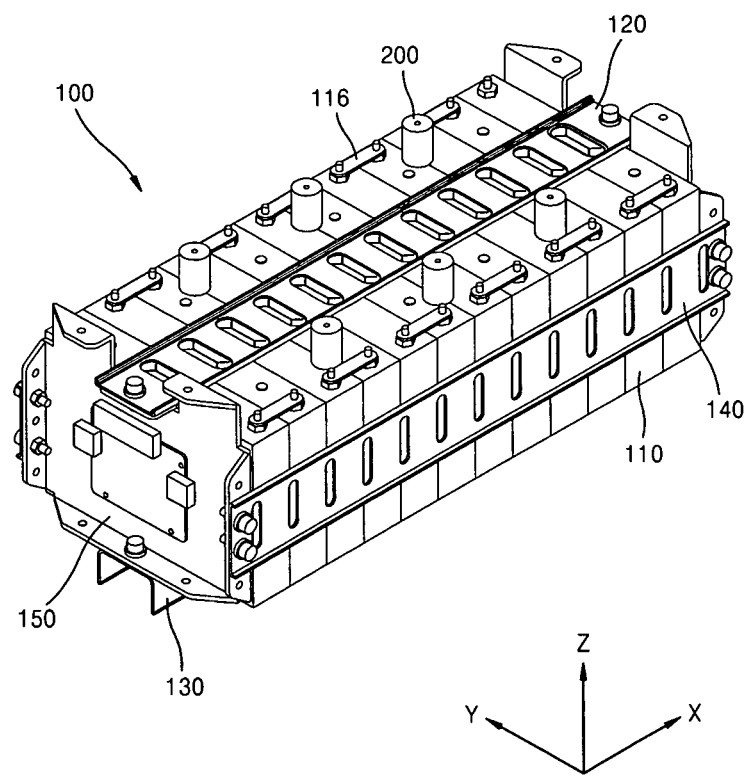
FIG. 1 illustrates a perspective view of a battery module in which a plurality of battery cells are horizontally stacked, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery pack 10 according to an embodiment may be formed by vertically and/or horizontally stacking one or more battery modules 100. Also, each of the battery modules 100 may be formed by vertically and/or horizontally stacking one or more unit battery cells 110.

Figure 4:
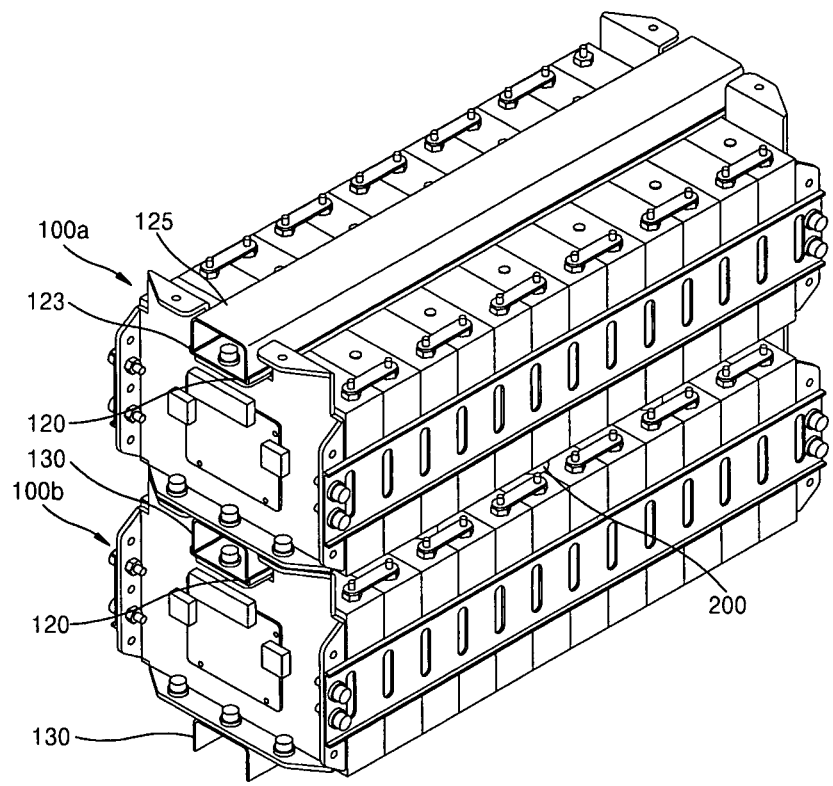
FIG. 4 illustrates a perspective view of vertically stacked battery modules between which supporting blocks are disposed, according to an embodiment.
Figure 5:
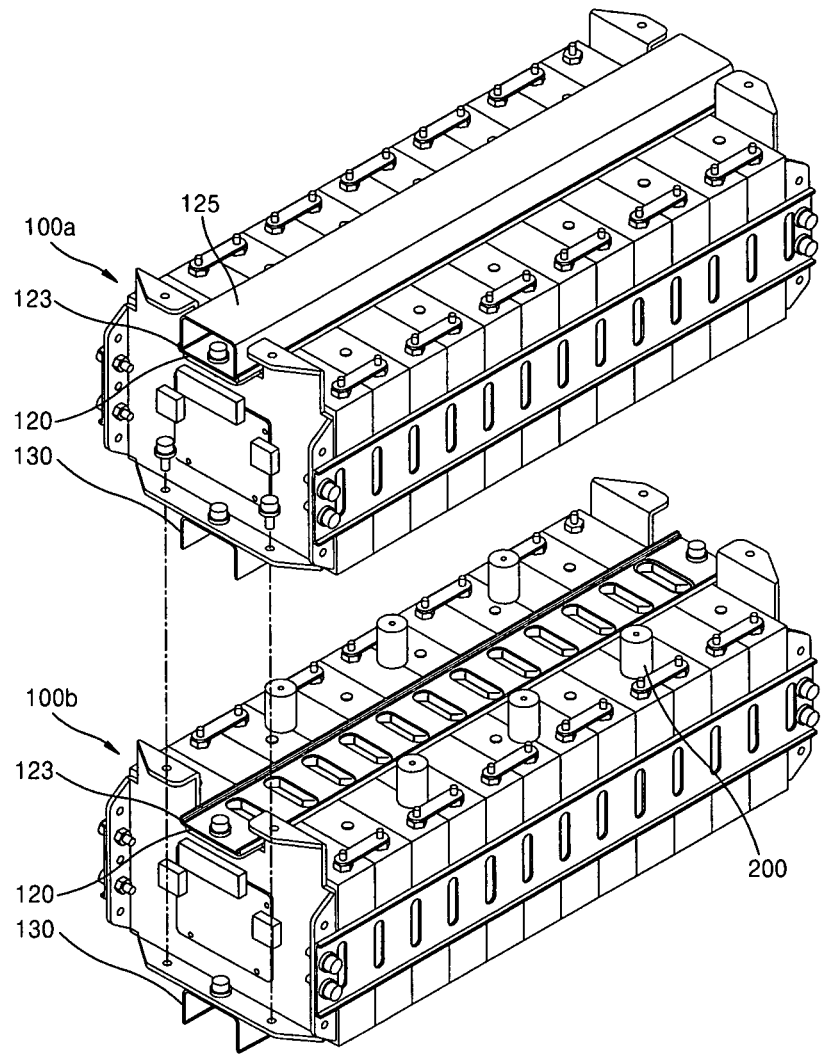
FIG. 5 illustrates a perspective view of the battery modules of FIG. 4 when the battery modules are separated.

In this case, as illustrated in FIGS. 4 and 5, the battery pack 10 may be formed by vertically stacking a plurality of battery modules 100a and 100b. Battery modules 100a and 100b include a upper battery module 100a and a lower battery module 100b which are vertically stacked together.

When the battery modules 100a and 100b are vertically stacked, the upper battery module 100a may be deflected due to the weight of a plurality of unit battery cells 110. Also, vibration of the battery modules 100 may occur due to the deflection of the upper battery module 100a. However, in the battery pack 10 according to an embodiment, one or more supporting blocks 200 may be formed between the battery modules 100a and 100b that are vertically stacked. In this case, the supporting blocks 200 may reduce deflection and vibration of the battery modules 100 by supporting portions of the battery modules 100 to be deflected.

Figure 2:
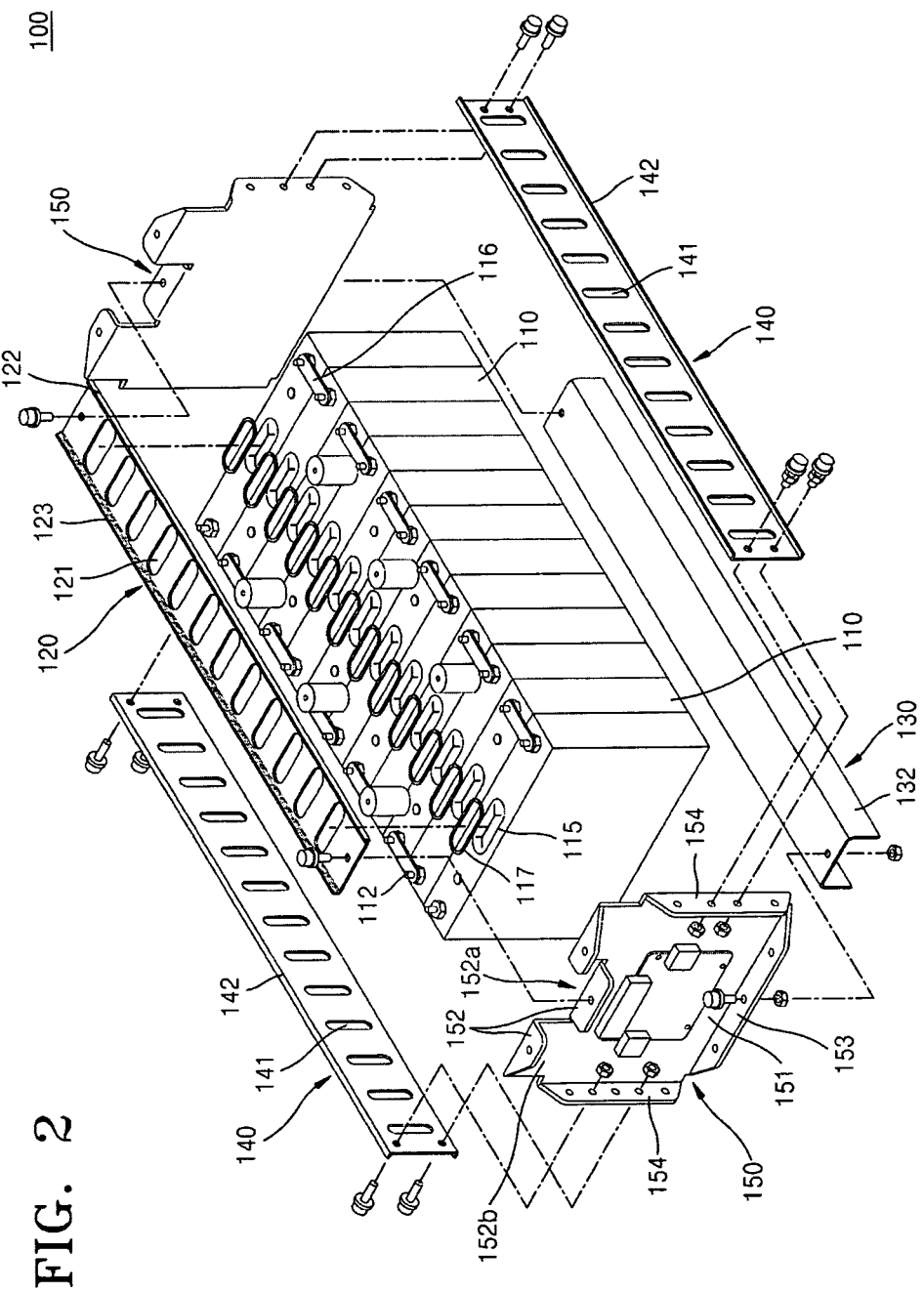
FIG. 2 illustrates an exploded perspective view of the battery module of FIG. 1.

FIG. 1 illustrates a perspective view of battery module 100 in which a plurality of battery cells 110 are horizontally stacked, according to an embodiment. FIG. 2 illustrates an exploded perspective view of the battery module 100 illustrated in FIG. 1. A battery pack may be formed by vertically and/or horizontally stacking a plurality of the battery modules 100.

Referring to FIGS. 1 and 2, the battery module 100 may include a plurality of unit battery cells 110, an upper frame 120, a lower frame 130, side frames 140, and end plates 150.

The unit battery cells 110 may be stacked in a first direction so as to form the battery module 100. The upper frame 120 may be disposed on the unit battery cells 110 stacked in the first direction so as to support the unit battery cells 110 in a second direction from upper surfaces of the unit battery cells 110. The lower frame 130 may be disposed under the unit battery cells 110 stacked in the first direction so as to support the unit battery cells 110 from lower surfaces of the unit battery cells 110.

The side frames 140 may be disposed at sides of the unit battery cells 110 stacked in the first direction so as to support the unit battery cells 110 from side surfaces of the unit battery cells 110. A pair of the end plates 150 may be disposed at ends of the unit battery cells 110 stacked in the first direction so as to support the unit battery cells 110 from the ends of the unit battery cells 110.

Here, the first direction may be an X direction and the second direction may be a Z direction. In this case, if the battery modules 100 are horizontally arranged, the X direction may be a horizontal direction and the Z direction may be a vertical direction. However, embodiments are not limited thereto, and the X and Z directions may differ according to the arrangement direction of the battery modules 100.

Figure 3:
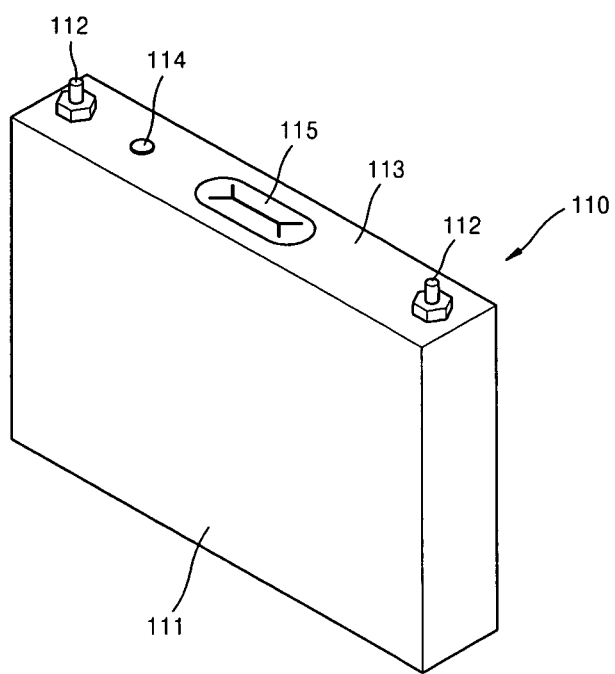
FIG. 3 illustrates a perspective view of a unit battery cell included in the battery module of FIG. 1, according to an embodiment.

FIG. 3 illustrates a perspective view of a unit battery cell 110 included in the battery module 100 illustrated in FIG. 1, according to an embodiment. A plurality of the unit battery cells 110 may be stacked in a horizontal direction so as to form the battery module 100. The unit battery cell 110 may be generally formed in an angular shape as illustrated in FIG. 3. However, embodiments are not limited thereto, and the unit battery cell 110 may have various shapes such as a cylindrical shape or a pouch shape.

Referring to FIGS. 1, 2, and 3, a general secondary battery may be used as the unit battery cell 110. The secondary battery may include an electrode assembly and an electrolyte. The electrode assembly may include a positive plate, a negative plate, and a separator. The electrolyte may include lithium ions. The positive plate and the negative plate of the electrode assembly may protrude outward so as to be electrically connected to a current collector.

The electrode assembly may be accommodated in a case 111, and electrode terminals 112 may be exposed outside the case 111. Respective current collectors, electrically connected to the positive plate or the negative plate, may be electrically connected to the electrode terminals 112. The case 111 may have a cylindrical shape or an angular shape. The unit battery cell 110 may include a plurality of electrode assemblies in one case 111.

The unit battery cells 110 may be horizontally stacked so as to form the battery module 100. In the battery module 100, the electrode terminals 112 of neighboring unit battery cells 110 may be electrically connected to each other. In this case, the electrode terminals 112 of the neighboring unit battery cells 110 may be electrically connected to each other by using, e.g., bus bars 116.

The neighboring unit battery cells 110 may be disposed so that their polarities are opposite to each other. The unit battery cells 110 may be connected in parallel, in series, or in parallel and series. As such, the unit battery cells 110 may be sequentially connected to each other so as to form one battery module 100. The connection method and the number of the unit battery cells 110 may be determined in consideration of required capacities of recharge or discharge when the unit battery cells 110 are designed.

A cap plate 113 may be combined with an opening portion of the case 111 to close the case 111. The cap plate 113 may be a thin plate. An electrolyte inlet for injecting the electrolyte into the case 111 may be formed in the cap plate 113. The electrolyte inlet may be sealed with a sealing plug 114 after the electrolyte is injected.

A vent member 115, in which grooves are formed, may be formed on the cap plate 113 such that the vent member 115 may be broken when a set internal pressure is reached. If the upper frame 120 is disposed on the unit battery cells 110 that are horizontally stacked, an exhaust outlet 121 of the upper frame 120 may be disposed on the vent member 115.

The unit battery cell 110 illustrated in FIG. 3 may be a lithium-ion secondary battery. However, embodiments are not limited thereto, and, in addition to the lithium-ion secondary battery, various batteries, such as a nickel-cadmium secondary battery, a nickel-hydrogen secondary battery, and a lithium battery, may be used as the unit battery cell 110.

In a unit battery cell 110 containing lithium, the electrode assembly may expand or contract when recharge or discharge occurs. In this case, the expansion and the contraction of the electrode assembly may apply physical force to the case 111. Accordingly, the case 111 may physically expand and contract in correspondence with the expansion and the contraction of the electrode assembly.

The case 111 may be deformed due to repeated expansion and contraction. The expansion in volume may increase resistance so as to reduce the efficiency of the unit battery cell 110. In this regard, a pair of the end plates 150 may be disposed at two ends of the unit battery cells 110 that are horizontally and/or vertically arranged and are electrically connected to each other. For example, the upper frame 120, the lower frame 130 and the side frames 140 may be respectively supported on upper, lower, and side surfaces of the end plates 150, and may compressively fix the unit battery cells 110 so as to reduce or eliminate horizontal expansion due to the expansion of the unit battery cells 110.

The end plates 150 may be disposed at two ends of the battery module 100. A pair of the end plates 150 may respectively contact outer surfaces of the unit battery cells 110 disposed at two ends of the battery module 100, so as to support the stacked unit battery cells 110.

An end plate 150 may include a base plate 151, and flanges 152, 153, and 154. The base plate 151 may have a size that is sufficient to cover an outer surface of the unit battery cells 110. Although the base plate 111 has an almost square shape in FIGS. 1 and 2, the shape of the base plate 111 is not limited thereto. The flanges 152, 153, and 154 may be bent from the base plate 151 away from the unit battery cells 110.

The flanges 152, 153, and 154 may include upper flanges 152, a lower flange 153, and side flanges 154. The upper flanges 152 may be combined with the upper frame 120. The lower flange 153 may be combined with the lower frame 130. The side flanges 154 may be correspondingly combined with the side frames 140.

A plurality of the battery modules 100 may be vertically and/or horizontally stacked so as to form the battery pack. In this case, the end plates 150 of neighboring battery modules 100 may be combined with each other so as to support each other.

For example, the upper flanges 152 of a first battery module 100 may be combined with the lower flanges 153 of a second battery module 100. Further, the lower flanges 153 of the first battery module 100 may be combined with the upper flanges 152 of a third battery module 100. In another implementation, the side flanges 154 of the first battery module 100 may be combined with the side flanges 154 of a fourth battery module 100 disposed alongside.

The upper, lower, and side flanges 152, 153, and 154 may be respectively combined with the upper, lower, and side frames 120, 130, and 140 by, e.g., screwing them together using bolts and nuts. However, embodiments are not limited thereto, and the upper, lower, and side flanges 152, 153, and 154 may be respectively combined with the upper, lower, and side frames 120, 130, and 140 by using various methods such as a welding method, riveting, etc.

The upper frame 120 may be disposed on the unit battery cells 110 that are horizontally stacked, and may be combined with the upper flanges 152 of the end plates 150. In this case, the exhaust outlets 121 may be formed in the upper frame 120 in correspondence with the vent members 115 of the unit battery cells 110.

The upper frame 120 may have upper frame bent portions 122, which may be bent from lengthwise edges of the upper frame 120. A sealing member 123 may be formed on inner sides of the upper frame bent portions 122. The sealing member 123 may be formed of, e.g., an elastic material such as rubber. The upper frame 120 may be combined with the lower frame 130 of the upper battery module 100 with the sealing member 123 interposed therebetween so as to form a gas passage for discharging a sealed gas.

Sealing rings 117 may be formed between the upper frame 120 and the vent members 115 such that a gas ejected from the vent members 115 flows out through the exhaust outlets 121 of the upper frame 120 without influencing a neighboring unit battery cell 110. For example, O-rings may be used as the sealing rings 117. In this case, grooves 152a in which the upper frame 120 is to be disposed may be formed in the middle of upper edges of the end plates 150. Thus, the exhaust outlets 121 of the upper frame 120 may contact the unit battery cells 110.

Also, the sealing rings 117 between the unit battery cells 110 and the upper frame 120 may have a sufficient thickness. Accordingly, when the upper frame 120 is combined with the end plates 150, the upper frame 120 may generate pressure on the unit battery cells 110 so as to compress the sealing rings 117 disposed therebetween, and thus the upper frame 120 may contact the unit battery cells 110.

The lower frame 130 may be disposed under the unit battery cells 110 so as to support the weight of the unit battery cells 110, and may be connected to the lower flanges 153 of the end plates 150. In order to support the weight of the unit battery cells 110, the lower frame 130 may include lower frame bent portions 132 bent away from the unit battery cells 110. The bent shape may make the lower frame 130 more rigid.

The lower frame bent portions 132 may be open downward. Also, the lower frame bent portions 132 may be combined with the upper frame 120 of the lower battery module 100 so as to form a gas passage.

The gas passage formed by combining the lower frame 130 of an upper battery module 100 and the upper frame 120 of a lower battery module 100 may function as a degassing duct for discharging a generated gas. The lower frame 130 of the upper battery module 100 and the upper frame 120 of the lower battery modules 100 may degas in a sealed state or may induce degassing even in an incompletely sealed state. A gas generated in the unit battery cells 110 may be accompanied with an explosion or a rapid chemical reaction corresponding to an explosion, and thus the amount of the gas is explosively increased in a short time. Thus, if a degassing duct is formed in the battery pack, the gas may be easily discharged.

The side frames 140 may be disposed at sides of the unit battery cells 110 so as to support the unit battery cells 110 from side surfaces of the unit battery cells 110. The side frames 140 may extend with a uniform width from one of a pair of the end plates 150 to the other of the pair of the end plates 150.

One or more through holes 141 may be formed in each of the side frames 140 so as to reduce the weight of the side frames 140. Also, the side frames 140 may include side frame bent portions 142 bent away from the unit battery cells 110. The side frame bent portions 142 may increase the strength and rigidity of the side frames 140 against bending.

One or more supporting blocks 200 may be formed between the battery modules 100, which may be stacked, e.g., vertically. In this case, the supporting blocks 200 may reduce deflection and vibration of the battery module 100 by supporting portions of the battery modules 100 to be deflected.

FIG. 4 illustrates a perspective view of vertically stacked battery modules 100a and 100b, between which supporting blocks 200 are disposed, according to an embodiment. FIG. 5 illustrates a perspective view of the battery modules 100a and 100b illustrated in FIG. 4 when the battery modules 100 are separated.

Referring to FIGS. 4 and 5, the battery pack 10 may be formed by vertically stacking a plurality of battery modules. The plurality of battery modules may include a upper battery module 100a and a lower battery module 100b which are vertically stacked together.

In the battery pack 10 having the battery modules 100a and 100b, the supporting blocks 200 may contact upper surfaces of unit battery cells 110 of the lower battery module 100b and lower surfaces of unit battery cells 110 of the upper battery module 100a.

In an implementation, double-sided tape may be adhered to upper and lower surfaces of the supporting blocks 200, such that the supporting blocks 200 may be adhered and fixed to the battery modules 100a and 100b. In an implementation, an adhesive agent may be coated on contact portions of the supporting blocks 200 and the battery modules 100a and 100b, so as to adhere the supporting blocks 200 to the battery modules 100a and 100b. However, embodiments are not limited thereto, and the supporting blocks 200 may be fixed to the battery modules 100a and 100b by using various methods, or may supported due to the pressure between the battery modules 100a and 100b without using an additional fixing means.

A plurality of the supporting blocks 200 may be used. The supporting blocks 200 may be disposed so as to uniformly distribute the weight of the upper battery module 100a to be supported. For example, the same number of the supporting blocks 200 may be disposed at two sides with respect to the upper frame 120. In this case, an even number of the supporting blocks 200 may be disposed.

The supporting blocks 200 may be formed as elastic members such that the battery modules 100a and 100b elastically support each other. For example, the supporting blocks 200 may be rubber blocks. In an implementation, the supporting blocks 200 may be formed to have a height slightly greater than the distance between the unit battery cells 110 of the battery modules 100a and 100b, so as to provide elastic bias.

The supporting blocks 200 may be formed in a shape such as a cylindrical shape, a polygonal pillar shape, or a barrel shape. In an implementation, in order to stably contact the unit battery cells 110, surfaces of the supporting blocks 200 to contact the unit battery cells 110 may be formed to be flat. However, the shape of the supporting blocks 200 is not limited thereto, and may be variously changed.

Through holes or grooves may be formed in surfaces of the supporting blocks 200 to contact the unit battery cells 110. In this case, the elastic force of the supporting blocks 200 may be increased. The supporting blocks 200 may reduce deflection and vibration of the upper battery module 100a by supporting portions of the upper battery module 100a to be deflected.

The upper battery module 100a, when disposed at the top layer, may further include a cover 125 for covering the upper frame 120. In an implementation, the cover 125 may form a degassing duct for discharging a gas generated in the top battery module 100a.

Figure 6:
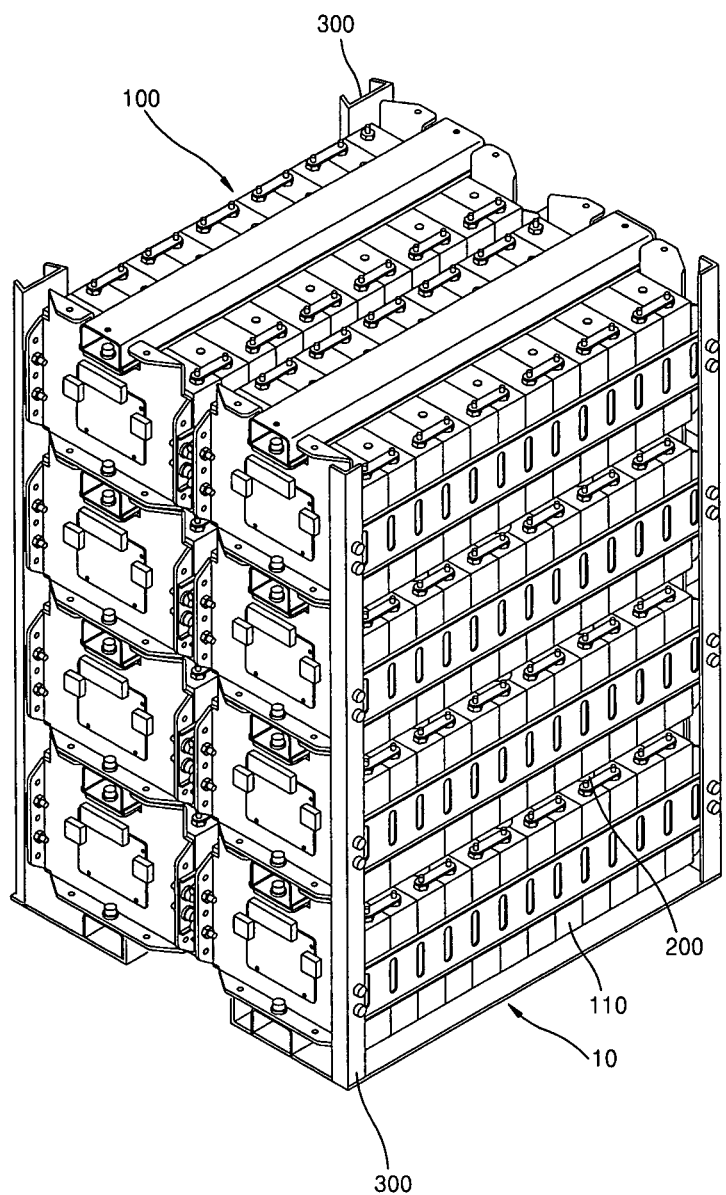
FIG. 6 illustrates a perspective view of a battery pack in which a plurality of the battery modules of FIG. 1 are vertically and horizontally stacked and are supported by an external frame, according to an embodiment.

FIG. 6 illustrates a perspective view of a battery pack 10 in which a plurality of the battery modules 100 illustrated in FIG. 1 are vertically and horizontally stacked and are supported by an external frame 300, according to an embodiment.

Referring to FIG. 6, the battery pack 10 may be formed by stacking eight battery modules 100, each of which is formed by horizontally stacking the unit battery cells 110, in two columns of four layers, and combining the battery modules 100.

Figure 7:
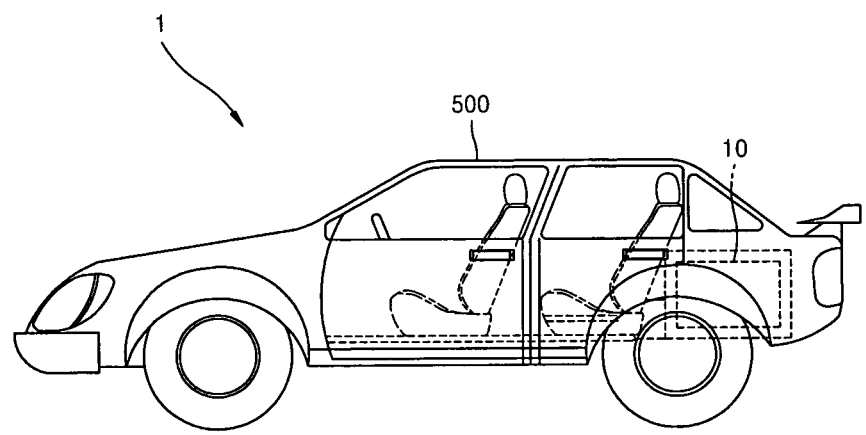
FIG. 7 illustrates an electric car 1 using the battery pack 10 described above in connection with FIG. 6, according to an embodiment.

FIG. 7 illustrates an electric car 1 using a battery pack 10 according to an embodiment.

Referring to FIG. 7, the battery pack 10 according to an embodiment may be equipped in the body 500 of the electric car 1. In the electric car 1 using the battery pack 10, as the electric car 1 runs, a dynamic load may be applied to the battery pack 10. In this case, deflection and/or vibration may occur in the battery modules 100 that are vertical and/or horizontally stacked. However, in the battery pack 10 according to an embodiment, the supporting blocks 200 may reduce the deflection and vibration of the battery modules 100 by supporting portions of the battery modules 100 to be deflected.

As described above, embodiments relate to a battery pack, and to a battery pack formed by vertically or horizontally stacking battery modules, each of which is formed by stacking a plurality of unit battery cells. According to the one or more embodiments, in a battery pack formed by vertically or horizontally stacking battery modules, each of which is formed by stacking a plurality of unit battery cells, deflection of the battery modules may be reduced.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
    a first battery module, the first battery module including first unit batteries arranged side by side in a first direction;
    a second battery module adjacent to the first battery module, the second battery module including second unit batteries arranged side by side in the first direction; and
    at least one supporting block in a space between the first unit batteries and the second unit batteries, the at least one supporting block directly contacting at least one of the first unit batteries and overlapping and directly contacting at least two of the second unit batteries, the first and second battery modules being arranged in a second direction that crosses the first direction, wherein the at least one supporting block is between and spaced from opposing first and second edges of the at least two second unit batteries, the first and second edges separated from one another in a third direction crossing the first and second directions and not overlapping the at least one supporting block, wherein a first surface of one of the at least two second unit batteries is in contact with an opposing second surface of the other of the at least two second unit batteries, and wherein the first unit batteries and the second unit batteries have a same orientation in the second direction.

2. The battery pack as claimed in claim 1, wherein the at least one supporting block elastically supports the at least one of the first unit batteries.

3. The battery pack as claimed in claim 1, wherein the first and second battery modules are spaced apart in the second direction.

4. The battery pack as claimed in claim 2, further comprising a plurality of supporting blocks arranged so as to uniformly distribute a weight of the first battery module on the second battery module.

5. The battery pack as claimed in claim 1, wherein:
    the at least one supporting block rests on both of the two adjacent second unit batteries, a first portion of the at least one supporting block overlapping a first one of the two adjacent second unit batteries and a second portion of the at least one supporting block overlapping a second one of the two adjacent second unit batteries.

6. The battery pack as claimed in claim 1, wherein the at least one supporting block includes an elastic member that is elastically deformable in the second direction.

7. The battery pack as claimed in claim 6, wherein the elastic member is a rubber member.

8. The battery pack as claimed in claim 6, wherein the at least one supporting block is compressed in the battery pack, the at least one supporting block having a length, when uncompressed, that is larger than that of the space.

9. The battery pack as claimed in claim 1, wherein the at least one supporting block is removably coupled to the second battery module.

10. The battery pack as claimed in claim 9, further comprising an adhesive member to removably couple the at least one supporting block to the second battery module.

11. The battery pack as claimed in claim 1, further comprising
    at least one additional battery module, the at least one additional battery module being combined with the first and second battery modules in a vertical stack, wherein at least one supporting block is disposed between adjacent battery modules in the vertical stack.

12. The battery pack as claimed in claim 1, wherein:
    the first battery module includes first battery module end plates disposed at respective ends of the first battery module,
    the second battery module includes second battery module end plates at respective ends of the second battery module, and
    the first and second battery module end plates support the first unit batteries such that the space is between the first unit batteries and the second unit batteries.

13. The battery pack as claimed in claim 12, further comprising
    side frames extending in the first direction, the side frames being coupled to the second battery module end plates and supporting the second unit batteries from side surfaces of the second unit batteries.

14. The battery pack as claimed in claim 13, further comprising
    a rigid member extending in the first direction, the rigid member being coupled to the second battery module end plates and supporting surfaces of the second unit batteries that are opposite to the first battery module.

15. The battery pack as claimed in claim 1, wherein:
    the at least one of the first unit batteries that directly contacts the at least one supporting block includes a side and terminals that project from the side, and
    the at least one support block directly contacts the side of the at least one of the first unit batteries and is spaced apart from the terminals of the at least one of the first unit batteries.

16. The battery pack as claimed in claim 1, wherein:
    the at least one supporting block has a first surface facing the first battery module and a second surface facing the second battery module, and
    the first surface and the second surface have substantially a same shape.

17. The battery pack as claimed in claim 16, wherein the first battery module and the second battery module have a same number of unit batteries.

18. A vehicle, comprising:
    a power source, the power source providing a motive power for the vehicle; and
    a battery pack configured to provide electricity to the power source, the battery pack including:
    a first battery module, the first battery module including first unit batteries arranged side by side in a first direction;
    a second battery module adjacent to the first battery module, the second battery module including second unit batteries arranged side by side in the first direction; and
    at least one supporting block in a space between the first unit batteries and the second unit batteries, the at least one supporting block directly contacting at least one of the first unit batteries and overlapping and directly contacting at least two of the second unit batteries, the at least one supporting block elastically supporting the first and second battery modules in a second direction crossing the first direction,
    wherein the at least one supporting block is between and spaced from opposing first and second edges of the at least two second unit batteries, the first and second edges separated from one another in a third direction crossing the first and second directions and not overlapping the at least one supporting block, wherein a first surface of one of the at least two second unit batteries is in contact with an opposing second surface of the other of the at least two second unit batteries, and wherein the first unit batteries and the second unit batteries have a same orientation in the second direction.

19. A method of stiffening a battery pack, the method comprising:

fixing first and second battery modules in a vertical stack, the first and second battery modules having respective end plates fixed together in a vertical direction so as to define a space between the first and second battery modules; and providing at least one supporting block in the space, the at least one supporting block overlapping and resting on at least two unit batteries of the second battery module, elastically supporting the first battery module in the vertical direction, and directly contacting a unit battery of the first battery module and the at least two unit batteries of the second battery module, wherein the at least one supporting block is between and spaced from opposing first and second edges of the at least two second unit batteries, the first and second edges separated from one another and not overlapping the at least one supporting block.

20. A method of forming a battery pack, the method comprising:

providing a first battery module, the first battery module including first unit batteries arranged side by side in a first direction;

arranging a second battery module adjacent to the first battery module, the second battery module including second unit batteries arranged side by side in the first direction; and providing at least one supporting block in the space between the first unit batteries and the second unit batteries, the at least one supporting block directly contacting at least one of the first unit batteries and overlapping and directly contacting at least two of the second unit batteries, the at least one supporting block elastically supporting the first and second battery modules in a second direction that crosses the first direction, wherein the at least one supporting block is between and spaced from opposing first and second edges of the at least two second unit batteries, the first and second edges separated from one another in a third direction crossing the first and second directions and not overlapping the at least one supporting block, wherein a first surface of one of the at least two second unit batteries is in contact with an opposing second surface of the other of the at least two second unit batteries, and wherein the first unit batteries and the second unit batteries have a same orientation in the second direction.

* * * * *